United States Patent
Gamble et al.

(10) Patent No.: US 10,106,926 B2
(45) Date of Patent: Oct. 23, 2018

(54) FORMULATIONS HAVING BENZOATE DYE CARRIERS FOR META-ARAMID ARTICLES

(71) Applicant: Dow Global Technologies LLC, Midland, MI (US)

(72) Inventors: Aleksandr T. Gamble, Midland, MI (US); Felipe A. Donate, Midland, MI (US); Rebecca J. Wachowicz, Bay City, MI (US)

(73) Assignee: Dow Global Technologies LLC, Midland, MI (US)

( * ) Notice: Subject to any disclaimer, the term of this patent is extended or adjusted under 35 U.S.C. 154(b) by 23 days.

(21) Appl. No.: 15/177,476

(22) Filed: Jun. 9, 2016

(65) Prior Publication Data

US 2016/0281296 A1  Sep. 29, 2016

Related U.S. Application Data

(63) Continuation of application No. 14/344,489, filed as application No. PCT/US2012/054850 on Sep. 12, 2012, now abandoned.

(60) Provisional application No. 61/540,703, filed on Sep. 29, 2011.

(51) Int. Cl.
| | |
|---|---|
| *D06P 1/651* | (2006.01) |
| *C09B 67/00* | (2006.01) |
| *D06P 3/24* | (2006.01) |
| *C09B 67/34* | (2006.01) |
| *D06P 1/62* | (2006.01) |
| *D06P 1/42* | (2006.01) |

(52) U.S. Cl.
CPC ...... *D06P 1/65131* (2013.01); *C09B 67/0076* (2013.01); *D06P 1/42* (2013.01); *D06P 1/623* (2013.01); *D06P 1/65125* (2013.01); *D06P 3/242* (2013.01)

(58) Field of Classification Search
CPC .......... C09B 69/065; D06P 3/241; D06P 1/41; D06P 1/44; D06P 1/65131; D06P 1/65168; D06P 1/90; D06P 3/001; D06P 1/622

See application file for complete search history.

(56) References Cited

U.S. PATENT DOCUMENTS

| | | | |
|---|---|---|---|
| 3,928,554 A | | 12/1975 | Hirschfeld |
| 3,967,925 A | * | 7/1976 | Economy ............... D06P 3/002 8/535 |
| 4,066,395 A | * | 1/1978 | Soiron ................. D06P 1/6135 8/583 |
| 4,464,180 A | | 8/1984 | Baumann |
| 5,092,904 A | | 3/1992 | Neely |
| 5,972,049 A | * | 10/1999 | Wicker, Jr. .......... C09B 67/0085 106/632 |
| 6,132,476 A | | 10/2000 | Lunsford et al. |
| 6,840,967 B1 | | 1/2005 | Riggins et al. |
| 7,967,873 B1 | | 6/2011 | Guthrie |
| 2005/0014435 A1 | | 1/2005 | Maini |
| 2008/0144362 A1 | | 6/2008 | Chuang et al. |

FOREIGN PATENT DOCUMENTS

| | | |
|---|---|---|
| CN | 101892603 A | 11/2010 |
| JP | S57-176267 A | 10/1982 |
| JP | S60-162883 A | 8/1985 |
| WO | 2006/122887 A2 | 11/2006 |

OTHER PUBLICATIONS

Derwent abstract for CN101892603A, wherein CN document has publication date of Nov 24, 2010.

\* cited by examiner

*Primary Examiner* — Amina S Khan
(74) *Attorney, Agent, or Firm* — Husch Blackwell LLP

(57) ABSTRACT

Glycol ether benzoates, glycol benzoates and methyl benzoate facilitate the dyeing of the meta-aramid article, e.g., fibers, at or near neutral pH. The addition of an anionic surfactant, such as sodium lauryl sulfate, enhances the performance of the benzoates.

9 Claims, No Drawings

FORMULATIONS HAVING BENZOATE DYE CARRIERS FOR META-ARAMID ARTICLES

CROSS REFERENCE TO RELATED APPLICATION

The present application is a continuation application of U.S. patent application Ser. No. 14/344,489 filed Mar. 12, 2014, now abandoned, which is the national phase of PCT Patent Application No. PCT/US2012/054850 filed Sep. 12, 2012, which claims priority to U.S. Provisional Application No. 61/540,703 riled Sep. 29, 2011, and the entire content of each is incorporated by reference herein.

BACKGROUND OF THE INVENTION

1. Field of the Invention

This invention relates to meta-aramid articles, e.g., fibers, fabrics and the like. In one aspect the invention relates to dyeing meta-aramid articles while in another aspect the invention relates to facilitating the dyeing of meta-aramid articles through the use of benzoate carrier.

2. Description of the Related Art

Meta-aramid articles, e.g., fibers such as NOMEX™ and CONEX™ (both polymetaphenylene isophthalic amide, which is formed by the reaction of meta-phenylenediamine and isophthaloyl chloride, and produced by DuPont and Teijin respectively), are used in various applications, largely for their fire resistant properties. Due to their hydrophobic nature, these articles are difficult to dye in typical aqueous dye baths as the dye molecules cannot easily penetrate the article.

In order to facilitate dye penetration, a carrier (sometimes referred to as a dye assist or solvent) must be used to swell the article and facilitate dye transport. The first commonly used carrier was acetophenone but it has fallen from favor due to odor and toxicity issues, and other carriers have been introduced or suggested as alternatives. For example, US 2005/0014435A1 describes the dyeing of aramid fibers with a dye bath formulated with CYNDAE C-45 (available from Bozzetto, Inc.) as a dye assist. JP 60162883 describes the use of a glycol ether (triethylene glycol monophenyl ether) in a dye bath for polyamide fibers. WO2006/122887A2 describes the use of another glycol ether (1-phenoxy-2-propanol) in the preparation of dye baths. US2002/0144362A1 describes 3,5,5-trimethyl-2-cyclohexen-1-one, also known as isophorone, as a dye carrier for polyamide fibers. This patent also references alkyl ketones and N-alkyl phthalimides as dye carriers. U.S. Pat. No. 6,132,476 describes the use of benzyl alcohol, N-alkyl pyrrolidones, N,N-dialkyl-benzamides, and aryl ether as dye carriers. U.S. Pat. No. 6,840,967 describes the use of ethylene glycol phenyl ether, and various amides and amines as dye carriers. JP 08134370 A2 describes the use of several glycol ethers, namely diethylene glycol monophenyl ether, ethylene glycol monophenyl ether, ethylene glycol monobenzyl ether, and diethylene glycol monobenzyl ether as dye carriers. Butyl benzoate is mentioned as a dye carrier by T. Vigo in "Textiles Processing and Properties—Preparation, Dyeing, Finishing, and Performance", Textile Science and technology 11, Elsevier Publishing, 1994, p 137.

Despite the identification and proposed uses of these many and varied dye carriers, interest remains in identifying new dye carriers for use with meta-aramid articles, particularly fibers, that are performance competitive with acetophenone but without the odor and toxicity issues associated with the use of acetophenone.

SUMMARY OF THE INVENTION

Surprisingly, glycol ether benzoates, glycol benzoates and methyl benzoate facilitate the dyeing of a meta-aramid articles at or near neutral pH. The addition of an anionic surfactant, such as sodium lauryl sulfate, enhances the performance of these benzoates.

In one embodiment the invention is an aqueous dye formulation comprising:
  A. A cationic dye;
  B. At least one of a glycol ether benzoate, glycol benzoate and methyl benzoate;
  C. Water; and
  D. Optionally, an anionic surfactant.

In one embodiment the dye formulation has a pH of 6-8. In one embodiment the water is de-ionized.

In one embodiment the invention is a method of dyeing a meta-aramid article, the method comprising the step of contacting the meta-aramid article with a dye formulation comprising:
  A. A cationic dye;
  B. At least one of a glycol ether benzoate, glycol benzoate and methyl benzoate;
  C. Water; and
  D. Optionally, an anionic surfactant;
the formulation having a pH of 6-8.

DETAILED DESCRIPTION OF THE PREFERRED EMBODIMENT

Definitions

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the relative amounts of the components of the dye bath.

"Comprising", "including", "having" and like terms are not intended to exclude the presence of any additional component, step or procedure, whether or not the same is specifically disclosed. In order to avoid any doubt, all compositions, solutions or baths, processes, etc., claimed through use of the term "comprising" may include one or more additional steps, pieces of equipment or component parts, and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Dye Carriers

The dye carriers used in the practice of this invention include methyl benzoate, glycol benzoates and glycol ether benzoates.

The glycol benzoates, also known as alkylene glycol dibenzoates, typically have an alkylene group (e.g., —$CH_2CH_2$—) of 2 to 10 carbon atoms bridging the two benzoic groups (e.g., $C_6H_5(C=O)$—O—), more typically 2 to 6 carbon atoms and even more typically 2 to 4 carbon atoms. Representative glycol benzoates include diethylene glycol mono- and dibenzoates, dipropylene glycol mono- and dibenzoates, triethylene glycol benzoates and trimethylene glycol dibenzoates.

The glycol ether benzoates used in the practice of this invention are of the formula

in which $R^1$ is a $C_{1-10}$ alkyl group, phenyl or benzyl, $R^2$ is either hydrogen, methyl or ethyl, $R^3$— is O=C—$C_6H_5$ from benzoic acid, and n=1-3. Representative glycol ether benzoates include 1-methoxy-2-propylbenzoate, 2-propoxyethyl benzoate, 2-butoxyethyl benzoate, 2-(2-phenoxyethoxy)ethyl benzoate and 2-(2-phenoxy-1-methyl ethoxy)-1-methyl ethoxy benzoate.

The benzoates of this invention can be used alone or in combination with one another and/or in combination with one or more other glycols and/or one or more alcohols. Representative blends include a blend of propylene glycol dibenzoates, or a blend of dipropylene glycol benzoates, or a blend of propylene glycol mono-benzoate, or a blend of a propylene glycol dibenzoate and a dipropylene glycol benzoate, and the like. One commercial blend of interest is BENZOFLEX™ 284 plasticizer which is blend of 1,2-propanediol and dibenzoate available from the Eastman Chemical Company and which is typically used with polyvinyl chloride applications. Another blend of interest is a blend of methyl benzoate and VELATE™ 368 which is 2-ethylhexyl benzoate and it also available from the Eastman Chemical Company. VELATE™ 368 is typically used in paint coatings.

In one embodiment the methyl benzoate, glycol benzoate and/or glycol ether benzoate dye carrier of this invention is used in combination with one or more anionic surfactants. Any anionic surfactant that will facilitate the benzoate carrier in delivering the dye to the aramid fiber can be used in the practice of this invention. Representative anionic surfactants are the linear alkyl sulfonates (e.g., sodium lauryl sulfate, sodium decyl sulfate, sodium tetradecyl sulfate), and the various DOWFAX™ anionic surfactants available from The Dow Chemical Company.

The amount of the glycol ether benzoates, glycol benzoates and/or alkyl benzoates in the dye formulation is typically 3 to 6 percent by weight (wt %), more typically 3.5 to 5 wt %. The amount of surfactant, if present, is typically of 1 to 4 wt %, more typically 1.5 to 3 wt %.

Cationic Dye

A variety of cationic dyes may be used in the practice of this invention, and different cationic dyes may be preferred depending on the dye process employed and the article to be dyed.

Representative cationic dyes (sometimes referred to as basic dyes) include ASTRAZON™ Olive Green BL and ASTRAZON™ Orange 3RL (also known, respectively, as Basic Green 6 and Basic Orange 27, and both formerly manufactured by Verona Dyestuffs) and Basic Yellow 21, Basic Blue 41, and Basic Red 18 (further identified in the color index, third edition, published by the Society of Dyers and Colourists, Dean House, Piccadilly Bradford, Yorkshire, England). Also useful as cationic dyes are Red GL, Yellow 5GL, Blue X-3GL-300, and Red FB, sold under the trade name BASACRYL™ by BASF Corporation. The aqueous formulation might include any combination of such dyes.

The amount of dye in the dye formulation can vary widely, but typically the dye is present in an amount of 0.05 to 5 wt %, more typically in an amount of 0.1 to 1 wt %.

Dye Formulation

The dye formulation used in this invention is an aqueous formulation comprising (A) a cationic dye, (B) at least one of a glycol ether benzoate, glycol benzoate and methyl benzoate, (C) water, preferably de-ionized water, and (D) optionally an anionic surfactant. In one embodiment, dye formulation used in this invention is an aqueous formulation consisting essentially of (A) a cationic dye, (B) at least one of a glycol ether benzoate, glycol benzoate and methyl benzoate, (C) water, and (D) optionally an anionic surfactant. The dye formulation can be either a solution or dispersion under dyeing conditions.

Various additives can be present in the dye formulation, and these include such materials as one or more salts, e.g., sodium nitrate or chloride, and/or emulsifiers, and/or surfactants other than anionic surfactants, and/or ultraviolet light absorbers, and/or pH adjusters, and/or other glycols, e.g., methoxytriglycol, and/or processing aids, and the like. These additives are well known in the art, and if used, are used in conventional amounts and in conventional ways.

The pH of the formulation is typically of 6 to 8, more typically of 6.3 to 6.8. The temperature of the dye formulation, particularly when it is used as an immersion bath, is typically of 120° C. to 170° C., more typically of 130° C. to 150° C.

The bulk of the dye formulation is, of course, water. If a concentrate of the dye formulation is desired for whatever reason, e.g., shipping, storage, etc., then the amount of water is decreased and the relative amounts of the other components of the formulation are proportionately increased. To ready for use, water is simply added to the concentrate to dilute it to the desire concentration of the other components.

Meta-aramid articles can be dyed using the dye formulation of this invention and conventional dying processes. In one embodiment, the article, e.g., a fiber, is immersed in a bath of the dye formulation under conventional dying conditions for a period of time sufficient to allow the dye to penetrate and attach to the fiber, and then is removed from the bath and dried. In one embodiment, the fiber is attached to an internal assembly (designed to hold the fiber) of a cylindrically shaped container, the container filled or partially filled with the dye formulation bath and sealed, the container then placed on or into an apparatus designed to heat the bath to an appropriate dyeing temperature and rotate the container over the period of time necessary to effect the desired level of dyeing (typically measured in hours). At the end of the dyeing cycle, the fiber is retrieved from the container and dried. In other embodiments the dye formulation can be applied to the article in a manner and under conditions other than typical immersion conditions which also allow for the dye to penetrate and attach to the article.

Although the invention is particularly useful for the dying of meta-aramid fibers or other such articles, the invention is also useful for the dyeing of articles made from other amide polymers including, but not limited to, para-aramid polymers, e.g., KEVLAR™, and polyamide polymers, e.g., NYLON™.

SPECIFIC EMBODIMENTS

The equipment used to dye meta-aramid fiber (NOMEX™ from DuPont) allowed the simultaneous evaluation of 12 individual dye solutions and NOMEX™ swatches using only about 20 milliliters (ml) dye solution and swatches measuring 3 centimeters (cm)×3 cm. The apparatus was configured in a rotisserie-type assembly. A central axle containing 6 brackets equipped with spring clamps is secured to brass bushing bearings inside an oven. One of the axle ends protrudes through the bearing outside the oven where it is attached to a variable speed motor. The brackets can each hold 2 stainless steel ampoules measuring about 6 inches in length and 1 inch in thickness. The ampoules are fitted with Swagelok compression fittings at one end and welded shut at the other, and are rated for greater than (>) 1000 pounds per square inch gauge (psig) pressure for tests in the 100-160° C. range. When attached to the brackets, the ampoules could be rotated end over end to provide suitable mixing and even dyeing of the swatch. Tests were conducted at 140° C. and 50 rpm.

All tests were conducted in the presence of excess dye. A stock dye aqueous solution containing 0.1% by weight Basic Blue #3 at pH 6.3 (adjusted with 0.1 N NaOH) was prepared and used for all experiments. In a typical experiment, an ampoule was placed on a lab analytical balance inside a holder and then 18.81 g of the dye solution was weighed in, followed by 0.80 g 1-methoxy-2-propyl benzoate, and 0.40 g sodium lauryl sulfate (SLS). A NOMEX™ swatch weighing 0.19 g was inserted into the ampoule which was then secured in a vise and sealed with the Swagelok fitting. The final dye bath contained 4% 1-methoxy-2-propyl benzoate and 2% SLS. This procedure was repeated with the next ampoule using the desired solvent and surfactant. When a surfactant was used, the final concentration of surfactant actives was kept at 2% by weight. All ampoules were weighed full and the weights recorded.

The loaded ampoules were placed in the holders and secured with the spring clamps. The oven was turned on and set for 140° C. The motor was turned on and set for 50 rpm. A timer was set for 1 hour and 27 minutes. When time had elapsed, the oven was cooled to 50° C. and the ampoules removed by an operator wearing heat resistant gloves and other protective equipment. The ampoules were placed in a bucket with ice to cool them down to room temperature, at which point they were wiped dry, reweighed to ascertain that no contents had been lost, and then opened.

The swatches were removed with tweezers and placed in separate 1-oz glass bottles containing 30 ml de-ionized water and labeled appropriately. The bottles were sealed and placed on a lab shaker for 10 minutes, then removed from the shaker, opened, and the rinse water discarded. This procedure was repeated at least two more times until the rinse water did not contain any residual blue dye. The swatches were then removed from the bottles, patted dry with paper towel, placed in labeled aluminum weighing dishes which were then placed in a 40° C. oven to dry for 40 minutes. When the time had elapsed, the swatches were removed from the oven and placed in covered plastic dishes. Care was taken to keep the dishes away from light as the color of dyed NOMEX™ material can be degraded by exposure to light.

A Hunter Lab ULTRASCAN™ Vis colorimeter was used to measure the color of the dyed swatches in terms of the L, a, b coordinate system. The colorimeter was calibrated with a D65-10 Diffuse 8° white tile provided by the manufacturer. An undyed swatch of NOMEX™ was placed in the center of a 4.25×4.25 inches black ceramic tile equipped with a mask designed to help position and hold the swatch on the tile. Several readings were taken and the results averaged. The undyed swatch was replaced with one of the dyed swatches so that color reading could be taken. This procedure was repeated with all the swatches. Results are summarized in the Table below.

TABLE

Color Data for Dyed Swatches

| Ex. | Solvents and Surfactants Added to Dye Solution | Swatch Color Readings | | |
|---|---|---|---|---|
| | | L | a | b |
| 1 | Undyed NOMEX Swatch | 81.34 | 2.41 | 6.38 |
| 2 | Blank | 43.44 | −12.74 | −9.49 |
| 3 | 2% SLS | 60.8 | −26.9 | −11.76 |
| 4 | 2% 1-phenoxy-2-propanol | 36.51 | −19.54 | −14.79 |
| 5 | 4% 1-phenoxy-2-propanol | 30.95 | −20.64 | −15.49 |
| 6 | 4% 1-phenoxy-2-propanol + 2% SLS | 37.45 | −27.91 | −16.27 |
| 7 | 2% 1-phenoxy-2-propanol + 2% SLS | 50.44 | −31 | −15.92 |
| 8 | 2% 1-phenoxy-2-propanol + DOWFAX ™ 2A1 (2% actives) | 39.91 | −24.19 | −17.84 |
| 9 | 4% 1-methoxy-2-propylbenzoate | 42.13 | −26.88 | −11.97 |
| 10 | 4% 1-methoxy-2-propylbenzoate + 2% MTG | 39.09 | −25.38 | −12.2 |
| 11 | 4% 1-methoxy-2-propylbenzoate - TERGITOL ™ 15-S-40 (2% actives) | 43.45 | −24.31 | −10.95 |
| 12 | 4% 1-methoxy-2-propylbenzoate - 2% SLS | 29.03 | −19.54 | −11.4 |
| 13 | 4% 2-propoxyethylbenzoate | 36.11 | 22.2 | −8.58 |
| 14 | 4% 2-butoxyethyl benzoate | 35.14 | 19.2 | −6.92 |
| 15 | 4% 2-butoxyethyl benzoate + 2% MTG | 33.62 | −19.08 | −4.46 |
| 16 | 4% 2-butoxyethyl benzoate + TERGITOL ™ 15-S-40 (2% actives) | 41.76 | −19.76 | −7.4 |
| 17 | 4% 2-butoxyethyl benzoate + 2% SLS | 29.73 | 18.8 | −11.56 |
| 18 | 4% 2-(2-phenoxyethoxy)ethyl benzoate | 33.4 | −13.96 | −9.12 |
| 19 | 4% 2-(2-phenoxy-1-methylethoxy)-1-methylethoxy benzoate | 32.39 | −22.65 | −14.69 |
| 20 | 4% 2-(2-phenoxy-1-methylethoxy)-1-methylethoxy benzoate + 2% MTG | 40.66 | −23 | −7.5 |
| 21 | 4% 2-(2-phenoxy-1-methylethoxy)-1-methylethoxy benzoate + TERGITOL ™ 15-S-40 (2% actives) | 43.81 | −20.75 | −6.05 |
| 22 | 4% 2-(2-phenoxy-1-methylethoxy)-1-methylethoxy benzoate + 2% SLS | 32.68 | −20.66 | −13.44 |
| 23 | 4% Methyl Benzoate | 36.97 | −15.53 | −4.41 |
| 24 | 4% BENZOFLEX ™ 284 | 33.26 | −13.29 | −5.96 |
| 25 | 4% VELATE ™ 368 | 39.42 | −18.25 | −4.29 |

Examples 2-25 each contained 0.1% Dye Solution.
™ Trademark of The Dow Chemical Company
SLS = Sodium lauryl sulfate surfactant (100% actives)
MTG = methoxytriglycol
TERGITOL ™ 15-S-40 = Linear secondary alcohol ethoxylated surfactant (70% in water)
DOWFAX ™ 2A1 = Alkyldiphenyl oxide disulfonate surfactant (45% in water)
BENZOFLEX ™ 284 = Mixture of propylene glycol dibenzoate, dipropylene glycol dibenzoate and propylene glycol monobenzoate from Eastman Chemicals
VELATE ™ = Mixture of benzoate esters from Eastman Chemicals The Hunter color coordinate system defines color in terms of a grid with coordinates L, a, and b. The a and b scales range from positive to negative. The more negative a is, the greener the sample appears, and the more positive the value, the redder the sample appears. Similarly, the more negative b is, the bluer the color shade, and the more positive the value, the yellower the color shade. The L scale ranges from 0 (black) to 100 (white). The lower the L value, the darker the color shade and the better the depth of color. Thus, lower L values are indicative of improved dye penetration into the fibers.

As can be seen from the data in Table, the undyed swatch (Example 1) had a very high L value (81.34) and a positive b value indicative of poor dyeing (as expected in an undyed sample). The use of the dye solution without solvents or surfactants (Example 2) resulted in some dyeing with an L value of 43.4. Addition of 2% sodium lauryl sulfate (SLS) to the dye solution (Example 3) did not improve the dye penetration and actually made it worse as indicated by an L value of 60.8. Addition of 1-phenoxy-2-propanol, a well know dye assist, to the dye solution at the 2% (Example 4) or 4% level (Example 5) improved the dyeing performance as indicated by L values of 36.5 and 30.95 respectively. Combining this solvent with SLS or DOWFAX™ 2A1 actually resulted in poorer performance (Example 6-8).

As can be seen, dye bath solutions containing 4% glycol ether benzoates (Examples 9, 13, 14, 18, 19) provided good dyeing performance as evidenced by L values as low as 32.39 which are comparable to those obtained with 1-phenoxy-2-propanol. Surprisingly, combining these glycol ether benzoates with SLS (Examples 12, 17, and 22) improved the depth of color beyond that obtained with the 1-phenoxy-2-propanol control as indicated by L values lower than 30.0. The addition of DOWFAX™ 2A1 or MTG had a small effect while the addition of the nonionic surfactant TERGITOL™ 15-S-40 was actually detrimental. BENZOFLEX™ 284 (a blend of glycol dibenzoates and mono-benzoates from Eastman Chemical Company), VELATE™ 368 (a benzoate ester from Eastman Chemical Company), and methyl benzoate are also shown as good dye carriers.

What is claimed is:

1. An aqueous dye formulation consisting of:
   A. a cationic dye;
   B. a glycol ether benzoate;
   C. water;
   D. an anionic surfactant; and
   E. optionally, an additive selected from the group consisting of a salt, an ultraviolet light absorber, a pH adjuster, methoxytriglycol, and combinations thereof.
2. The dye formulation of claim 1 having a pH of 6-8.
3. The dye formulation of claim 1 in which the glycol ether benzoate is of the formula $$R^1-O(CH_2CH(R^2))_n-O-R^3$$

in which $R^1$ is a $C_{1-10}$ alkyl group, phenyl or benzyl, $R^2$ is either hydrogen, methyl or ethyl, $-R^3$ is $C=C-C_6H_5$ from benzoic acid, and n=1-3.

4. The dye formulation of claim 3 in which the dye is present in an amount of 0.05 to 5 wt %, the glycol ether benzoate is present in an amount of 3 to 6 wt %, and the water is de-ionized.
5. The dye formulation of claim 4 in which the glycol ether benzoate is at least one of 1-methoxy-2-propylbenzoate, 2-propoxyethyl benzoate, 2-butoxyethyl benzoate, 2-(2-phenoxyethoxy)ethyl benzoate and 2-(2-phenoxy-1-methylethoxy)-1-methylethoxy benzoate.
6. The dye formulation of claim 5 in which the anionic surfactant is present in an amount of 1-4 wt %.
7. The dye formulation of claim 1 in which the anionic surfactant is selected from the group consisting of sodium lauryl sulfate, sodium decyl sulfate, and sodium tetradecyl sulfate.
8. The dye formulation of claim 1 in which the anionic surfactant is sodium lauryl sulfate.
9. The dye formulation of claim 1 in which the glycol ether benzoate is 1-methoxy-2-propylbenzoate.

* * * * *